United States Patent
Ye et al.

(10) Patent No.: US 12,427,839 B2
(45) Date of Patent: Sep. 30, 2025

(54) APPARATUS FOR CONTROLLING A VEHICLE AFTER BLOW FUNCTION, VEHICLE SYSTEM HAVING THE SAME AND METHOD THEREOF

(71) Applicants: HYUNDAI MOTOR COMPANY, Seoul (KR); Kia Corporation, Seoul (KR)

(72) Inventors: Kwang Hae Ye, Seoul (KR); Sung Kwan Choo, Hwaseong-si (KR); Wan Hee Lee, Hwaseong-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 364 days.

(21) Appl. No.: 17/970,976

(22) Filed: Oct. 21, 2022

(65) Prior Publication Data
US 2023/0373273 A1    Nov. 23, 2023

(30) Foreign Application Priority Data
May 18, 2022    (KR) .................. 10-2022-0061008

(51) Int. Cl.
| | | |
|---|---|---|
| *B60H 1/00* | (2006.01) | |
| *B60H 3/00* | (2006.01) | |
| *B60L 1/00* | (2006.01) | |
| *B60R 16/023* | (2006.01) | |

(52) U.S. Cl.
CPC ....... *B60H 3/0092* (2013.01); *B60H 1/00778* (2013.01); *B60H 1/00828* (2013.01); *B60L 1/003* (2013.01); *B60R 16/0231* (2013.01)

(58) Field of Classification Search
CPC .............. B60H 1/00828; B60H 3/0085; B60H 1/00821; B60R 16/0231; H02J 7/0048
See application file for complete search history.

(56) References Cited

U.S. PATENT DOCUMENTS

| | | | | |
|---|---|---|---|---|
| 5,899,082 | A * | 5/1999 | Stein ................ | B60H 1/00828 62/282 |
| 6,624,615 | B1 * | 9/2003 | Park ...................... | B60L 53/11 320/150 |
| 6,658,871 | B1 * | 12/2003 | Stein .................... | B60H 3/0085 62/282 |
| 9,050,885 | B1 * | 6/2015 | Dudar .................... | B60K 15/03 |
| 10,399,410 | B2 * | 9/2019 | Cosgrove ............ | B60H 1/00778 |
| 10,486,627 | B2 * | 11/2019 | Han ........................ | G01R 31/387 |
| 11,396,246 | B2 * | 7/2022 | Oestreich ............ | B60L 15/2045 |
| 2001/0025889 | A1 * | 10/2001 | Salberg ................ | B60H 1/2206 237/12.1 |
| 2004/0103862 | A1 * | 6/2004 | Aidnik .................... | F01P 7/164 123/41.44 |
| 2008/0134715 | A1 * | 6/2008 | Lewis .................. | B60H 1/2221 62/498 |
| 2009/0000146 | A1 * | 1/2009 | Salim .................. | B60H 3/0085 34/437 |

(Continued)

*Primary Examiner* — Dino Kujundzic
(74) *Attorney, Agent, or Firm* — MORGAN, LEWIS & BOCKIUS LLP (57) ABSTRACT

A vehicle after blow control apparatus includes a processor configured to perform an after-blow function by driving a blow motor using a high voltage battery after a vehicle is turned off; and a storage configured to store data and algorithms obtained by the processor.

18 Claims, 5 Drawing Sheets

(56) References Cited

U.S. PATENT DOCUMENTS

| | | | | |
|---|---|---|---|---|
| 2009/0024252 A1* | 1/2009 | Aridome | ................ | B60L 58/30 |
| | | | | 700/275 |
| 2009/0130965 A1* | 5/2009 | Galvez-Ramos | .. | B60H 1/00778 |
| | | | | 219/202 |
| 2010/0236502 A1* | 9/2010 | Watanabe | ................ | F01P 7/04 |
| | | | | 123/41.02 |
| 2012/0012661 A1* | 1/2012 | Gordon | ............. | B60H 1/00378 |
| | | | | 236/49.3 |
| 2012/0255279 A1* | 10/2012 | Atluri | .................... | F01N 3/027 |
| | | | | 60/299 |
| 2013/0145647 A1* | 6/2013 | Kim | .................... | B60H 3/0085 |
| | | | | 34/492 |
| 2014/0100731 A1* | 4/2014 | Ono | ...................... | B60W 10/30 |
| | | | | 180/65.265 |
| 2014/0183939 A1* | 7/2014 | Jiang | ........................ | B60L 1/08 |
| | | | | 429/231.1 |
| 2015/0120133 A1* | 4/2015 | Dudar | ............... | F02M 25/0809 |
| | | | | 701/34.4 |
| 2016/0151520 A1* | 6/2016 | Lee | ........................ | A61L 2/088 |
| | | | | 422/186.3 |
| 2016/0288616 A1* | 10/2016 | Gutowski | ............ | B60H 1/2218 |
| 2017/0002719 A1* | 1/2017 | Dudar | ....................... | F01P 1/06 |
| 2017/0015208 A1* | 1/2017 | Dunlap | ................... | B60L 50/15 |
| 2017/0125861 A1* | 5/2017 | Machida | ................... | H01M 10/613 |
| 2017/0174157 A1* | 6/2017 | Deljevic | ................. | B60L 58/12 |
| 2017/0267067 A1* | 9/2017 | Cosgrove | ........... | B60H 1/00778 |
| 2017/0284276 A1* | 10/2017 | Wilder | .................... | F01P 7/167 |
| 2019/0143837 A1* | 5/2019 | Inagaki | .............. | B60H 1/00778 |
| | | | | 701/22 |
| 2019/0203630 A1* | 7/2019 | Dudar | ............... | B60W 50/0097 |
| 2020/0324616 A1* | 10/2020 | Farhi | ..................... | B60K 25/02 |
| 2021/0061194 A1* | 3/2021 | Sugawa | ................... | H04L 12/66 |
| 2022/0048362 A1* | 2/2022 | Park | .................... | B60H 1/00978 |
| 2022/0118952 A1* | 4/2022 | Gutowski | ............ | B60W 10/30 |
| 2022/0185066 A1* | 6/2022 | Heo | ................ | B60H 1/00764 |
| 2022/0324399 A1* | 10/2022 | Chen | ...................... | B60R 16/03 |
| 2023/0068183 A1* | 3/2023 | Liu | ................... | B60R 16/0315 |
| 2023/0191873 A1* | 6/2023 | Feltham | ............... | B60H 1/0073 |
| | | | | 701/36 |
| 2023/0271509 A1* | 8/2023 | Harshe | ..................... | B60L 1/02 |
| | | | | 701/22 |
| 2024/0051371 A1* | 2/2024 | Bae | ..................... | B60H 1/3233 |

* cited by examiner

APPARATUS FOR CONTROLLING A VEHICLE AFTER BLOW FUNCTION, VEHICLE SYSTEM HAVING THE SAME AND METHOD THEREOF

CROSS-REFERENCE TO RELATED APPLICATION

The present application claims priority to Korean Patent Application No. 10-2022-0061008, filed on May 18, 2022, the entire contents of which is incorporated herein for all purposes by this reference.

BACKGROUND OF THE PRESENT DISCLOSURE

Field of the Present Disclosure

The present disclosure relates to a vehicle after blow control apparatus, a vehicle system including the same, and a method thereof, and more particularly, to an after blow control technique using a high voltage battery of an electric vehicle.

Description of Related Art

In general, a vehicle is provided with an air conditioner to increase pleasure and comfort of an occupant in the vehicle and to promote safe driving during vehicle driving. The occupant may properly maintain a temperature, humidity, and an air environment in the vehicle by use of the air conditioner depending on changes in a surrounding environment.

An unpleasant odor may occur from an air vent from which air is discharged when such an air conditioner is driven, so an after-blow function, which operates a blower motor after a predetermined time period (e.g., 30 min) has elapsed after the vehicle is turned off and dries an Eva core to suppress an odor-generating environment is being applied.

This after-blow function operates in a parking state after a customer gets out of the vehicle, vehicle battery power is used, and in the instant case, whenever after-blow function operates, 12V battery power is used, causing frequent charging and discharging of a 12V battery, which deteriorates durability of the 12V battery. Accordingly, to secure battery durability performance, it is necessary to apply an AGM battery, which has a higher material cost and heavier weight than an existing CMF battery, becoming a constraint on an expanded application of the after-blow function.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle after blow control apparatus, a vehicle system including the same, and a method thereof, which performs an after-blow function by use of a high-voltage battery of an electrified vehicle after it is turned off.

Furthermore, another exemplary embodiment of the present disclosure has been made in an effort to provide a vehicle after blow control apparatus, a vehicle system including the same, and a method thereof, configured for accurately determining an after-blow entry point by determining whether a user gets off or boards it based on a vehicle communication sleep state after it is turned off.

The technical objects of the present disclosure are not limited to the objects mentioned above, and other technical objects not mentioned may be clearly understood by those skilled in the art from the description of the claims.

An exemplary embodiment of the present disclosure provides a vehicle after blow control apparatus including: a processor configured to perform driving a blow motor using a battery after a vehicle is turned off; and a storage configured to store data and algorithms obtained by the processor.

In an exemplary embodiment of the present disclosure, the processor may be configured to determine an entry point of the after-blow function by monitoring a vehicle communication state after the vehicle is turned off.

In an exemplary embodiment of the present disclosure, the processor may be configured to determine whether the vehicle communication state is a sleep state, and when the sleep state is maintained for more than a predetermined time period, may determine it as the entry point of the after-blow function.

In an exemplary embodiment of the present disclosure, the processor may be configured to request power application of electrified vehicle controllers to the integrated control unit when the sleep state is maintained for more than the predetermined time period.

In an exemplary embodiment of the present disclosure, the processor may be configured to determine whether the blow motor is driven by determining a state of charge (SOC) value of a battery when the sleep state is maintained for more than the predetermined time period.

In an exemplary embodiment of the present disclosure, the processor may be configured to drive the blow motor by use of the battery when an SOC value of the battery is greater than or equal to a predetermined reference value.

Various aspects of the present disclosure are directed to providing a vehicle system including: a blow motor; a battery; and an after blow control apparatus configured to perform an after-blow function by driving a blow motor using a battery after a vehicle is turned off.

In an exemplary embodiment of the present disclosure, it may further include a gateway configured to provide vehicle communication state information to the after blow control apparatus.

In an exemplary embodiment of the present disclosure, the after blow control apparatus, based on the vehicle communication state information received from the gateway, may be configured to determine an entry point of the after-blow function by monitoring a vehicle communication state.

In an exemplary embodiment of the present disclosure, the after blow control apparatus may be configured to determine whether the vehicle communication state is a sleep state, and when the sleep state is maintained for more than a predetermined time period, may determine it as the entry point of the after-blow function.

In exemplary embodiment of the present disclosure, it may further include: a battery management system configured to manage a state of the battery; and a power conversion device configured to convert high voltage power of the battery into low voltage power.

In an exemplary embodiment of the present disclosure, it may further include an integrated control unit configured to apply power to the battery management system when receiving a request from the after blow control apparatus of applying power to the battery management system and the power conversion device.

In an exemplary embodiment of the present disclosure, the after blow control apparatus, when power is applied to the battery management system and the power conversion device by the integrated control unit, may be configured to receive state of charge (SOC) information of the battery from the battery management system.

In an exemplary embodiment of the present disclosure, the after blow control apparatus may be configured to drive the blow motor by use of the battery when an SOC value of the battery is greater than or equal to a predetermined reference value.

In an exemplary embodiment of the present disclosure, the power conversion device may convert high voltage power of the battery into low voltage power to apply the low voltage power to the blower motor.

An exemplary embodiment of the present disclosure provides a vehicle after blow control method including performing an after-blow function by driving a blow motor using a battery after a vehicle is turned off.

In an exemplary embodiment of the present disclosure, the performing of the after-blow function may include determining an entry point of the after-blow function by monitoring a vehicle communication state after the vehicle is turned off.

In an exemplary embodiment of the present disclosure, the determining of the entry point of the after-blow function may include: determining whether the vehicle communication state is a sleep state; and when the sleep state is maintained for more than a predetermined time period, determining it as the entry point of the after-blow function.

In an exemplary embodiment of the present disclosure, the performing of the after-blow function may include requesting power application of electrified vehicle controllers to the integrated control unit when the sleep state is maintained for more than a predetermined time period.

In an exemplary embodiment of the present disclosure, the performing of the after-blow function may include determining whether the blow motor is driven by determining a state of charge (SOC) value of a battery when the sleep state is maintained for more than the predetermined time period.

According to the present technique, it is possible to perform an after-blow function by use of a high-voltage battery of an electrified vehicle after it is turned off.

Furthermore, it is possible to accurately determine an after-blow entry point by determining whether a user gets off or boards it based on a vehicle communication sleep state after it is turned off Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 5.

Figure 1:
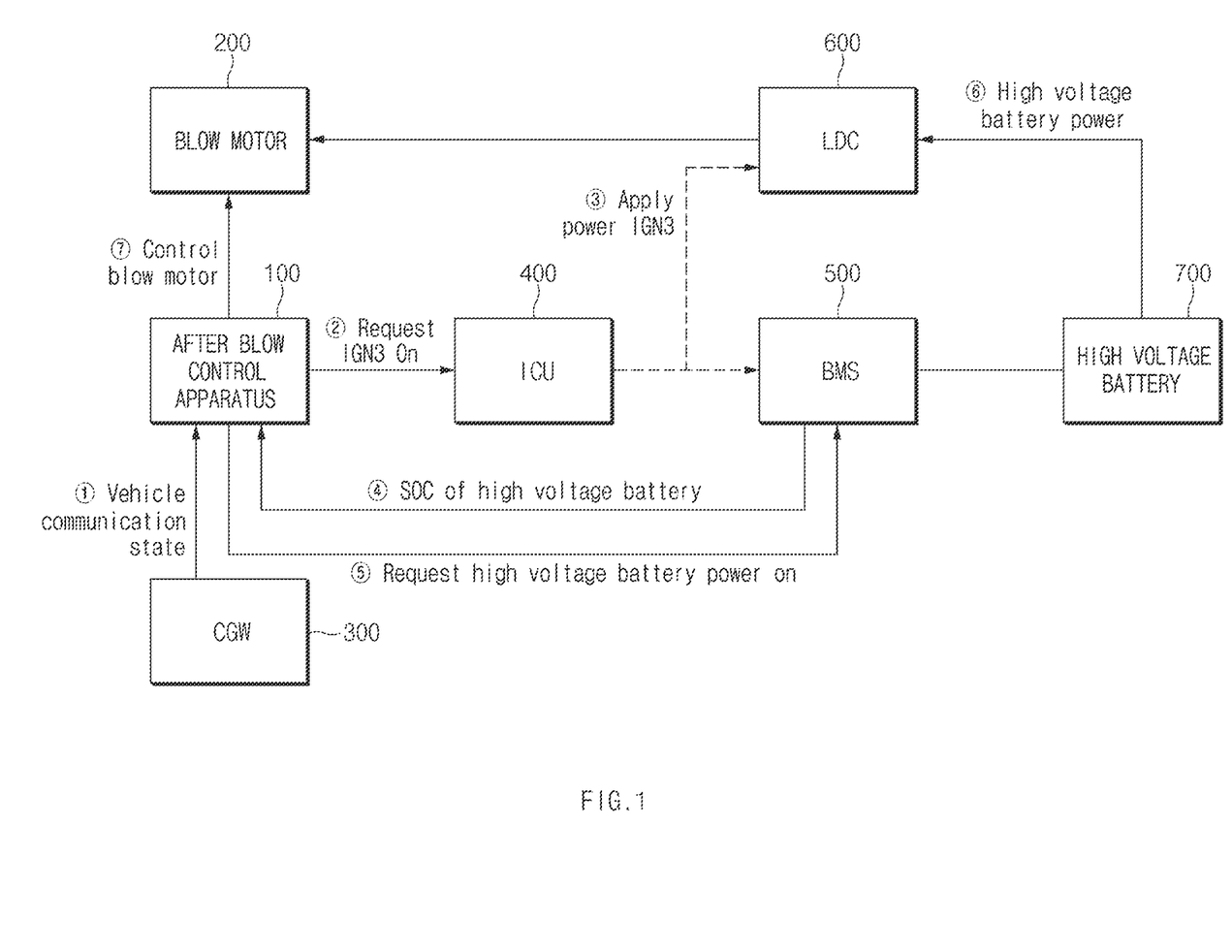
FIG. 1 illustrates a block diagram showing a configuration of a vehicle system including a vehicle after blow control apparatus according to an exemplary embodiment of the present disclosure.
Figure 2:
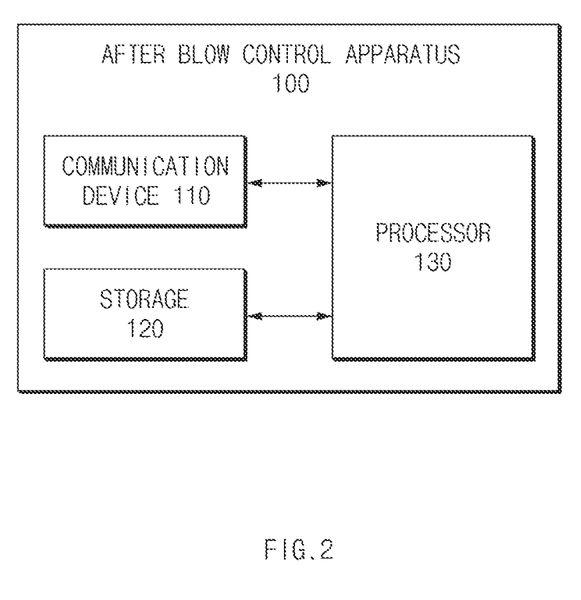
FIG. 2 illustrates a detailed configuration of a vehicle after blow control apparatus according to an exemplary embodiment of the present disclosure.

FIG. 1 illustrates a block diagram showing a configuration of a vehicle system including a vehicle after blow control apparatus according to an exemplary embodiment of the present disclosure, and FIG. 2 illustrates a detailed configuration of a vehicle after blow control apparatus according to an exemplary embodiment of the present disclosure.

The vehicle system in the present disclosure may include an electrified vehicle such as a hybrid electric vehicle (HEV), a plug-in hybrid electric vehicle (PHEV), and an electric vehicle (EV), provided with a high voltage battery.

Referring to FIG. 1, the vehicle system according to an exemplary embodiment of the present disclosure may include an after blow control apparatus 100, a blow motor 200, a gateway 300, an integrated control unit 400, a battery management system 500, a power conversion device 600, and a high voltage battery 700.

The after blow control apparatus 100 according to the exemplary embodiment of the present disclosure may be implemented inside the vehicle. In the instant case, the after blow control apparatus 100 may be integrally formed with internal control units of the vehicle, or may be implemented as a separate device to be connected to control units of the vehicle by a separate connection means.

The after blow control apparatus 100 performs an after-blow function by driving a blow motor using a high voltage battery after the vehicle is turned off. In the instant case, the after-blow function indicates a function for preventing mold and odors caused by remaining moisture by providing ventilation to a vehicle air conditioner, etc. to dry moisture, etc. after driving the vehicle air conditioner, etc. while driving the vehicle, and then turning off the engine when the vehicle is parked.

Furthermore, the after blow control apparatus 100 may monitor a vehicle communication state after the vehicle is turned off, to accurately determine an entry point of the after-blow function.

The after blow control apparatus 100, which is an air conditioning control apparatus, may be implemented as a dual automatic temperature control (DATC), a full automatic temperature control (FATC), heating, ventilation, air conditioning (HVAC), or the like.

The blow motor 200 is controlled by the after blow control apparatus 100 to be driven to provide blow to an interior of the vehicle.

The gateway 300, which is a CGW (Central Gateway), performs interworking between various controllers in the vehicle, and transmits vehicle communication state information to the after blow control apparatus 100. FIG. 1 includes an example in which a configuration of the gateway 300 is separately provided, and the gateway 300 or a module configured for determining a vehicle communication state may be included in the after blow control apparatus 100 to be implemented.

The integrated control unit 400, which is an integrated central control unit (ICU), receives requests from other controllers through logic signals or CAN signals to operate necessary functions through control logic. When receiving a request for application of power IGN3 for driving the battery management system 500 and the power conversion device 600 from the after blow control apparatus 100, the integrated control unit 400 may apply the power IGN3 to the battery management system 500 and the power conversion device 600.

The battery management system 500 manages state information of a high voltage battery 700, and transfers a state of charge (SOC) value of the high voltage battery 700 to the after blow control apparatus 100. Furthermore, the battery management system 500 may turn on the high voltage battery 700 when receiving a request to turn on the high voltage battery 700 from the after blow control apparatus 100.

The power conversion device 600, which a low DC/DC converter (LDC), converts a high voltage applied from the high voltage battery 700 into a low voltage to apply it to the blow motor 200.

The high voltage battery 700, which is an energy source for powering the vehicle, provides a high voltage to the blow motor 200 through the power conversion device 600 under control of the battery management system 500.

As illustrated in FIG. 1, after the vehicle is turned off, ① the after blow control apparatus 100 determines whether it is in a vehicle communication sleep state based on the vehicle communication state information received from the gateway 300, when the vehicle communication sleep state is maintained for a predetermined time period, determines that there is no customer in the vehicle, and ② requests the application of the power IGN3 to the battery management system 500 and the power conversion device 600 to the integrated control unit 400 to perform the after-blow function. Accordingly, ③ the integrated control unit 400 applies power to the battery management system 500 and the power conversion device 600, and ④ the battery management system 500 transfers state information of a high voltage battery to the after blow control apparatus 100. Accordingly, the after blow control apparatus 100 determines a current SOC value of the high voltage battery 700 by use of the state information of the high voltage battery, and when the current SOC value of the high voltage battery 700 remains above a predetermined reference value, ⑤ requests the battery management system 500 to turn on the high voltage battery 700. Accordingly, ⑥ the high voltage battery 700 applies high voltage battery power to the blow motor 200 through the power conversion device 600. ⑦ Accordingly, the after blow control apparatus 100 is configured to control an operation of the blow motor 200.

Referring to FIG. 2, the after blow control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include controller area network (CAN) communication, Local Interconnect Network (LIN) communication, flex-ray communication, and the like.

As an exemplary embodiment of the present disclosure, the communication device 110 may communicate with the blow motor 200, the gateway 300, the integrated control unit 400, the battery management system 500, and the like.

FIG. 1 includes an example in which the gateway 300 is configured separately from the after blow control apparatus 100, but the present disclosure is not limited thereto, and the gateway 300 may be integrated with the after blow control apparatus 100 so that the communication device 110 performs the function of the gateway 300.

The storage 120 may store data and/or algorithms required for the processor 130 to operate, and the like. As an exemplary embodiment of the present disclosure, the storage 120 may store an SOC value of the high voltage battery 700, a vehicle communication state, and the like. The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may electrically control each component, and may be an electrical circuit that executes software commands, performing various data processing and calculations described below.

The processor 130 may process a signal transferred between components of the after blow control apparatus 100, and may be implemented in a form of hardware, or may be implemented in a form of software, or may be implemented in a form of a combination of hardware and software. For example, the controller 40 may be implemented as a microprocessor, but the present disclosure is not limited thereto.

The processor 130 may perform an after-blow function by driving the blow motor 200 using a high voltage battery after the vehicle is turned off.

The processor 130 may monitor a vehicle communication state after the vehicle is turned off, to determine an entry point of the after-blow function. That is, the processor 130 may determine whether the vehicle communication state is a sleep state, and may determine a time point at which the sleep state is maintained for a predetermined time period (e.g., 10 min) or more as an entry time of the after-blow function. In the instant case, the predetermined time period may be determined in advance by experimental values.

When the vehicle communication state is a sleep state for more than the predetermined time period after vehicle ignition is turned off, the processor 130 may determine that all users in the vehicle have alighted to perform an after-blow operation.

When the sleep state is maintained for the predetermined time period or longer, the processor 130 may request power application of the electrified vehicle controllers (e.g., a battery management system, a power conversion device, etc.) from the integrated control unit 400.

When the sleep state is maintained for more than the predetermined time period, the processor 130 may determine whether the blow motor 200 is driven by determining the state of charge (SOC) value of the high voltage battery 700.

The processor 130 may drive the blow motor 200 by use of the high voltage battery 700 when the SOC value of the high voltage battery 700 is greater than or equal to a predetermined reference value (e.g., 40%). In the instant case, the reference value may be determined in advance by experimental values.

Accordingly, according to an exemplary embodiment of the present disclosure, when a 12V battery is used to drive the blow motor by driving the blow motor using a high voltage battery, it is possible to solve a problem of frequent charging and discharging of 12V batteries and cost and weight problems when using AGM batteries instead of the 12V batteries.

Furthermore, conventionally, because the blow motor is operated 30 minutes after determining whether to enter by an SOC value of the 12V battery at a time point of turning off the vehicle, there was a problem in that it was not possible to check a change in SOC value of the battery from the time of the turning off to 30 minutes after the vehicle was turned off, while according to an exemplary embodiment of the present disclosure, because the blow motor is operated immediately after checking the SOC value of the high voltage battery, a state of the SOC value of the high voltage battery is accurate.

Furthermore, in the related art, because it is not possible to know exactly whether a user is on board after the vehicle is turned off, the blow motor is operated by determining that the user has got off within 30 minutes of turning off the vehicle, and thus the after-blow function may be operated while the user is riding, while in the present disclosure, it is possible to accurately determine whether the user gets off and boards by monitoring the vehicle communication state after the vehicle is turned off. That is, it is possible to accurately determine a time of entry into operation of the after-blow function by accurately determining whether the user is getting off or boarded by determining the vehicle communication sleep state in which no operation is made in the vehicle.

Figure 3:
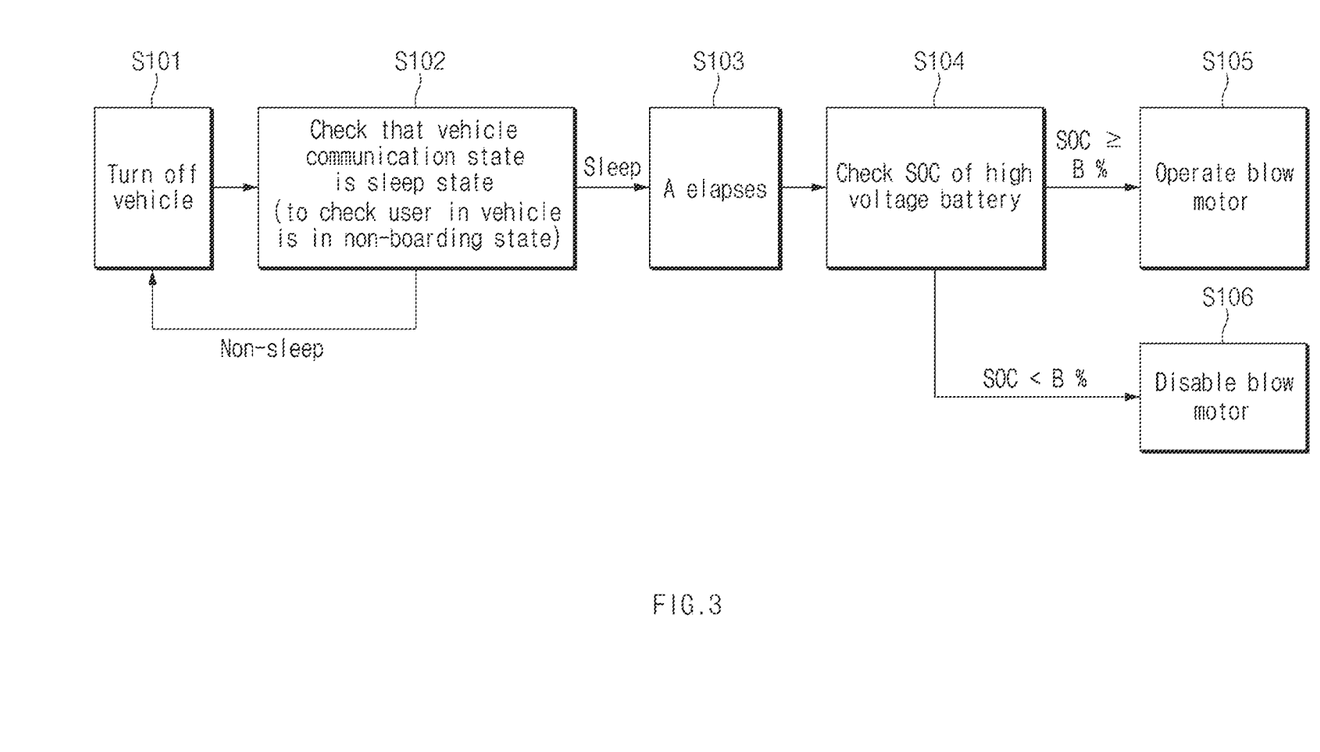
FIG. 3 illustrates a schematic view for describing a vehicle after blow control method according to an exemplary embodiment of the present disclosure.

FIG. 3 illustrates a schematic view for describing a vehicle after blow control method according to an exemplary embodiment of the present disclosure.

Referring to FIG. 3, after turning off the vehicle (S101), the after blow control apparatus 100 determines whether a vehicle communication state is a sleep state (S102), to determines whether a user in the vehicle is currently in a non-boarding state. That is, when the user in the vehicle is on board, the vehicle communication state becomes a wake-up state by performing an operation, such as opening a door or releasing a belt lock. However, because the above-described operation does not occur when the user in the vehicle is not in the vehicle, the vehicle communication state becomes the sleep state.

The after blow control apparatus 100 determines whether the vehicle communication sleep state is maintained until a predetermined time period A (e.g., 10 minutes) elapses (S103), and when the vehicle communication sleep state is maintained until the predetermined time period (e.g., 10 minutes) elapses, the after blow control apparatus 100 checks an SOC value of the high voltage battery (S104).

Accordingly, when the SOC value of the high voltage battery is greater than or equal to a predetermined reference value (B %) (e.g., 40%), the after blow control apparatus 100 operates the blow motor 200 by use of the high voltage battery (S105).

On the other hand, when the SOC value of the high voltage battery is smaller than the predetermined reference value, the after blow control apparatus 100 disables the blow motor 200 (S106).

Figure 4:
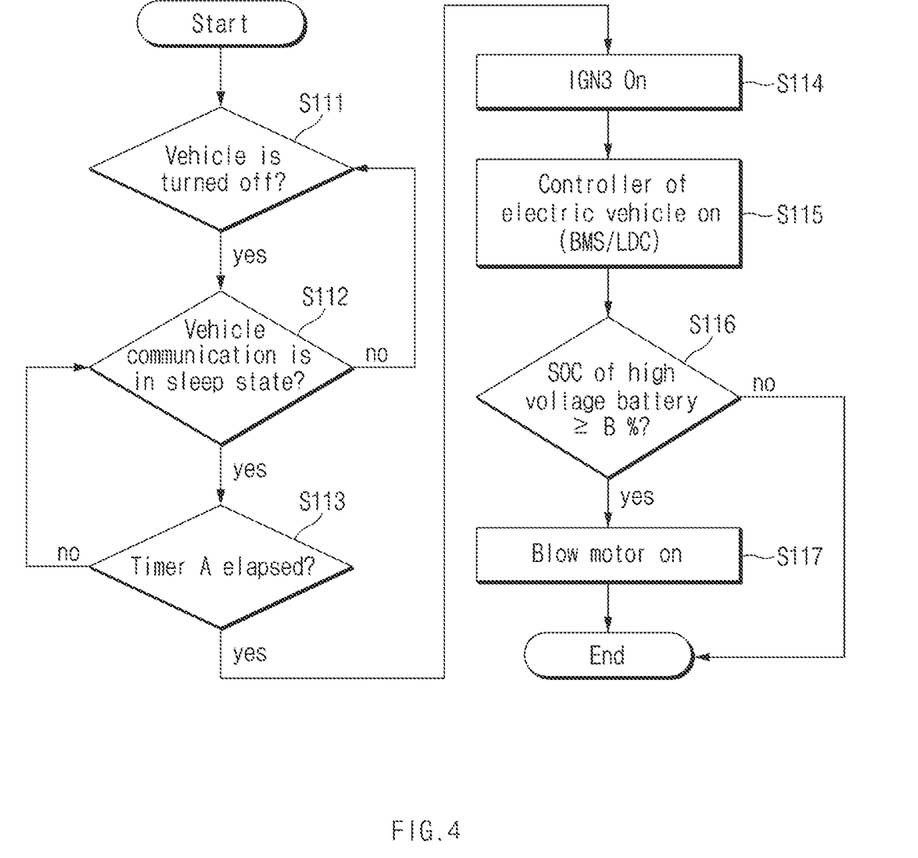
FIG. 4 illustrates a flowchart showing a vehicle after blow control method according to an exemplary embodiment of the present disclosure.

Hereinafter, a vehicle after blow control method according to various exemplary embodiments of the present disclosure will be described in detail with reference to FIG. 4. FIG. 4 illustrates a flowchart showing a vehicle after blow control method according to an exemplary embodiment of the present disclosure.

Hereinafter, it is assumed that the after blow control apparatus 100 of the of FIG. 1 performs processes of FIG. 4. Furthermore, in the description of FIG. 4, operations referred to as being performed by a device may be understood as being controlled by the processor 130 of the after blow control apparatus 100.

Referring to FIG. 4, the after blow control apparatus 100 determines whether the vehicle is turned off (S111), and when the vehicle is turned off, determines whether a vehicle communication state is a sleep state (S112). In the instant case, when the vehicle is turned off and no operation is made in the vehicle, that is, when a user gets off, the vehicle communication state is the sleep state.

In the vehicle sleep state, the after blow control apparatus 100 counts a timer and determines whether a predetermined time period A has elapsed (S113), and when a counting value of the timer elapses the predetermined time period A, requests application of the power IGN3 for activation of a controller of an electric vehicle such as the battery management system 500 and the power conversion device 600 to the integrated control unit 400 (S114).

Accordingly, when power is applied to the battery management system 500, the power conversion device 600, etc. by the integrated control unit 400 (S115), the after blow control apparatus 100 determines whether an SOC value of the high voltage battery is equal to or greater than a predetermined reference value (B %) based on SOC state information of the high voltage battery received from the battery management system 500 (S116).

The after blow control apparatus 100 ends the above-described process when the SOC value of the high voltage battery is smaller than the predetermined reference value (B %).

On the other hand, when the SOC value of the high voltage battery is smaller than the predetermined reference value (B %), the after blow control apparatus 100 applies high voltage battery power to the blow motor 200 to drive the blow motor 200 (S117).

Accordingly, according to an exemplary embodiment of the present disclosure, it is possible to solve the problem of driving the blow motor using a conventional 12V battery or an AGM type battery by driving the blow motor using the high voltage battery of the electrified vehicle to provide the after-blow function after the vehicle is turned off.

Furthermore, according to an exemplary embodiment of the present disclosure, it is possible to increase user satisfaction by monitoring the vehicle communication status after turning off the vehicle, accurately determining whether the user is getting off, and then activating the after-blow function.

Figure 5:
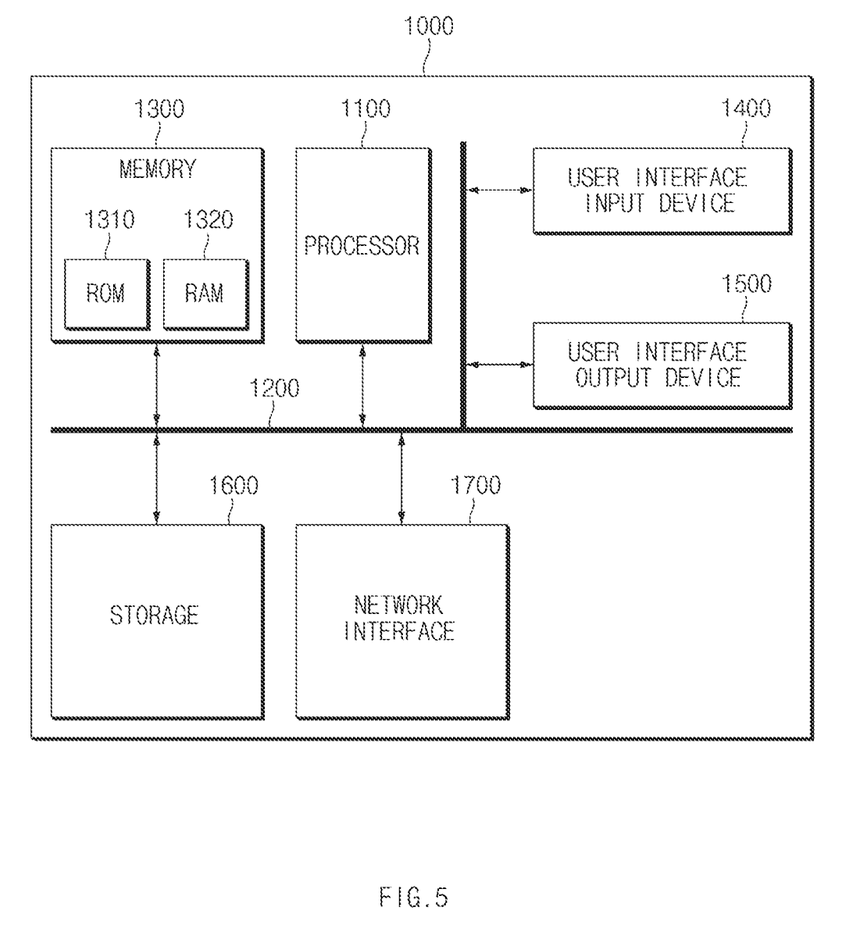
FIG. 5 illustrates a computing system according to an exemplary embodiment of the present disclosure.

FIG. 5 illustrates a computing system according to an exemplary embodiment of the present disclosure.

Referring to FIG. 5, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle after blow control apparatus comprising:
a processor configured to perform driving a blow motor using a battery after a vehicle is turned off; and
a storage configured to store data and algorithms obtained by the processor,
wherein the processor is configured to:
determine an entry point of the performing of driving the blow motor by determining boarding state of a user based on monitoring a vehicle communication state after the vehicle is turned off,
drive the blow motor at the entry point of the performing of driving the blow motor to dry an air inside the vehicle, and
wherein, based on the vehicle communication state information received from a gateway in the vehicle, the processor is further configured to determine the boarding state of the user and the entry point of the performing of driving the blow motor by monitoring the vehicle communication state via the gateway.

2. The vehicle after blow control apparatus of claim 1, wherein the processor is configured to determine whether the vehicle communication state is a sleep state, and when the sleep state is maintained for more than a predetermined time period, to determine the predetermined time period as the entry point of the performing of driving the blow motor.

3. The vehicle after blow control apparatus of claim 2, wherein the processor is configured to request power application of electrified vehicle controllers to an integrated control unit when the sleep state is maintained for more than the predetermined time period.

4. The vehicle after blow control apparatus of claim 2, wherein the processor is configured to determine whether the blow motor is driven by determining a state of charge (SOC) value of the battery when the sleep state is maintained for more than the predetermined time period.

5. The vehicle after blow control apparatus of claim 4, wherein the processor is configured to drive the blow motor by use of the battery when the processor concludes that the SOC value of the battery is greater than or equal to a predetermined reference value.

6. A vehicle system comprising:
a blow motor;
a battery; and
an after blow control apparatus configured to perform driving the blow motor using the battery after a vehicle is turned off,
wherein the after blow control apparatus is configured to:
determine an entry point of the performing of driving the blow motor by determining boarding state of a user based on monitoring a vehicle communication state after the vehicle is turned off, and
drive the blow motor at the entry point of the performing of driving the blow motor to dry an air inside the vehicle,
wherein the blow motor is driven by the battery of the vehicle, and
wherein, based on the vehicle communication state information received from a gateway in the vehicle, the after blow control apparatus is further configured to determine the boarding state of the user and the entry point of the performing of driving the blow motor by monitoring the vehicle communication state via the gateway.

7. The vehicle system of claim 6, further including:
the gateway configured to provide the vehicle communication state information to the after blow control apparatus.

8. The vehicle system of claim 7, wherein the after blow control apparatus, based on the vehicle communication state information received from the gateway, is configured to determine an entry point of the performing of driving the blow motor by monitoring a vehicle communication state.

9. The vehicle system of claim 8,
wherein the after blow control apparatus is configured to determine whether the vehicle communication state is a sleep state, and
wherein when the sleep state is maintained for more than a predetermined time period, the after blow control apparatus is configured to determine the predetermined time period as the entry point of the performing of driving the blow motor.

10. The vehicle system of claim 9, further including:
a battery management system configured to manage a state of the battery; and
a power conversion device configured to convert high voltage power of the battery into low voltage power.

11. The vehicle system of claim 10, further including an integrated control unit configured to apply power to the battery management system when receiving a request from the after blow control apparatus of applying power to the battery management system and the power conversion device.

12. The vehicle system of claim 11, wherein the after blow control apparatus, when the power is applied to the battery management system and the power conversion device by the integrated control unit, is configured to receive state of charge (SOC) information of the battery from the battery management system.

13. The vehicle system of claim 12, wherein the after blow control apparatus is configured to drive the blow motor by use of the battery when an SOC value of the battery is greater than or equal to a predetermined reference value.

14. The vehicle system of claim 13, wherein the power conversion device converts high voltage power of the battery into low voltage power to apply the low voltage power to the blower motor.

15. A vehicle after blow control method including:
performing, by a processor, driving a blow motor using a battery after a vehicle is turned off,
wherein the performing of driving the blow motor includes:
determining, by the processor, an entry point of the performing of driving the blow motor by determining boarding state of a user based on monitoring a vehicle communication state after the vehicle is turned off; and
driving the blow motor at the entry point of the performing of driving the blow motor to dry an air inside the vehicle,
wherein the blow motor is driven by the battery of the vehicle, and
wherein, based on the vehicle communication state information received from a gateway in the vehicle, the processor is further configured to determine the boarding state of the user and the entry point of the performing of driving the blow motor by monitoring the vehicle communication state via the gateway.

16. The vehicle after blow control method of claim 15, wherein the determining of the entry point of the performing of driving the blow motor includes:
determining, by the processor, whether the vehicle communication state is a sleep state; and
when the sleep state is maintained for more than a predetermined time period, determining, by the processor, the predetermined time period as the entry point of the performing of driving the blow motor.

17. The vehicle after blow control method of claim 16, wherein the performing of driving the blow motor includes:
requesting, by the processor, power application of electrified vehicle controllers to an integrated control unit when the sleep state is maintained for more than a predetermined time period.

18. The vehicle after blow control method of claim 17, wherein the performing of driving the blow motor includes determining, by the processor, whether the blow motor is driven by determining a state of charge (SOC) value of the battery when the sleep state is maintained for more than the predetermined time period.

* * * * *